US012732030B2

(12) United States Patent
Park

(10) Patent No.: US 12,732,030 B2
(45) **Date of Patent: *Sep. 8, 2026**

(54) DEVICE FOR TRANSMITTING WIRELESS POWER, METHOD FOR TRANSMITTING WIRELESS POWER, DEVICE FOR RECEIVING WIRELESS POWER, AND METHOD FOR RECEIVING WIRELESS POWER

(71) Applicant: LG ELECTRONICS INC., Seoul (KR)

(72) Inventor: Yongcheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/921,798

(22) Filed: Oct. 21, 2024

(65) Prior Publication Data

US 2025/0079910 A1 Mar. 6, 2025

Related U.S. Application Data

(63) Continuation of application No. 17/909,049, filed as application No. PCT/KR2021/002813 on Mar. 8, 2021, now Pat. No. 12,155,237.

(30) Foreign Application Priority Data

Mar. 6, 2020 (KR) ........................ 10-2020-0028591
Mar. 27, 2020 (KR) ........................ 10-2020-0037320

(51) Int. Cl.

*H02J 50/80* (2016.01)
*H02J 50/10* (2016.01)
*H04B 5/79* (2024.01)

(52) U.S. Cl.

CPC .............. *H02J 50/80* (2016.02); *H02J 50/10* (2016.02); *H04B 5/79* (2024.01)

(58) Field of Classification Search

None
See application file for complete search history.

(56) References Cited

U.S. PATENT DOCUMENTS

2015/0115918 A1* 4/2015 Oikarinen ............... G05F 1/575 323/280
2015/0155918 A1* 6/2015 Van Wageningen .... H02J 50/80 307/104
2016/0149440 A1* 5/2016 Staring ................... H02J 50/90 307/104
2017/0229926 A1* 8/2017 Oettinger ................ H02J 50/80

* cited by examiner

*Primary Examiner* — Menatoallah Youssef
*Assistant Examiner* — Aqeel H Bukhari
(74) *Attorney, Agent, or Firm* — BRYAN CAVE LEIGHTON PAISNER LLP

(57) ABSTRACT

A method for transmitting wireless power according to one embodiment of the present specification involves: receiving information about received power values for two or more correction points for power correction from a device for receiving wireless power; constructing a power correction curve, for detecting foreign substances, on the basis of the information about the received power values; and transmitting a data packet requesting initiation of a power correction protocol for updating the power correction curve.

13 Claims, 21 Drawing Sheets

FIG. 3b

| | b7 | b6 | b5 | b4 | b3 | b2 | b1 | b0 |
|---|---|---|---|---|---|---|---|---|
| Byte 0 | Application Profile | | | | | | | |
| Byte 1 | Version | | | | | | | |
| Byte 2-N-1 | Profile-specific data | | | | | | | |

FIG. 5

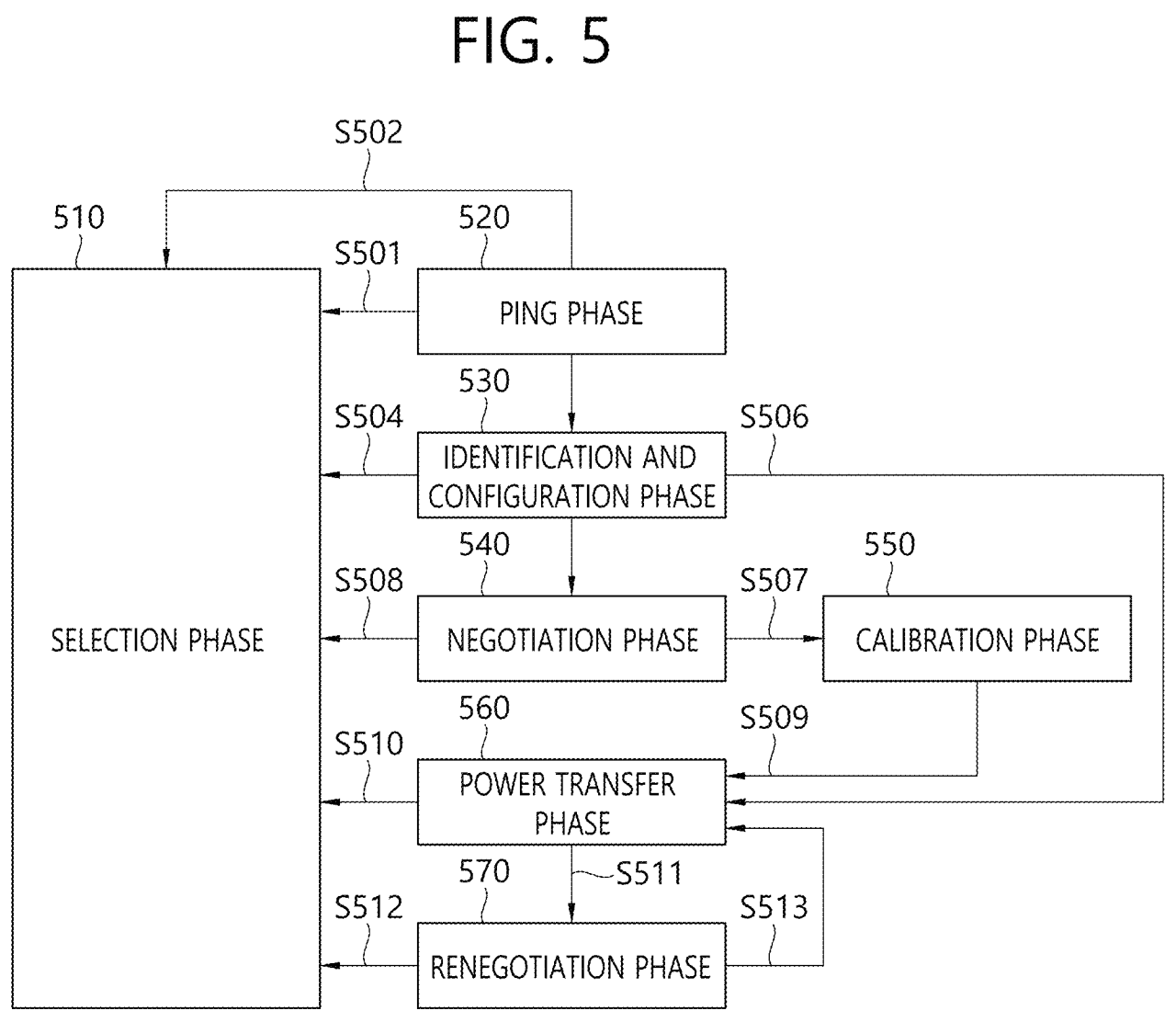

510 SELECTION PHASE
520 PING PHASE
530 IDENTIFICATION AND CONFIGURATION PHASE
540 NEGOTIATION PHASE
550 CALIBRATION PHASE
560 POWER TRANSFER PHASE
570 RENEGOTIATION PHASE
S501
S502
S504
S506
S507
S508
S509
S510
S511
S512
S513

Figure 6:
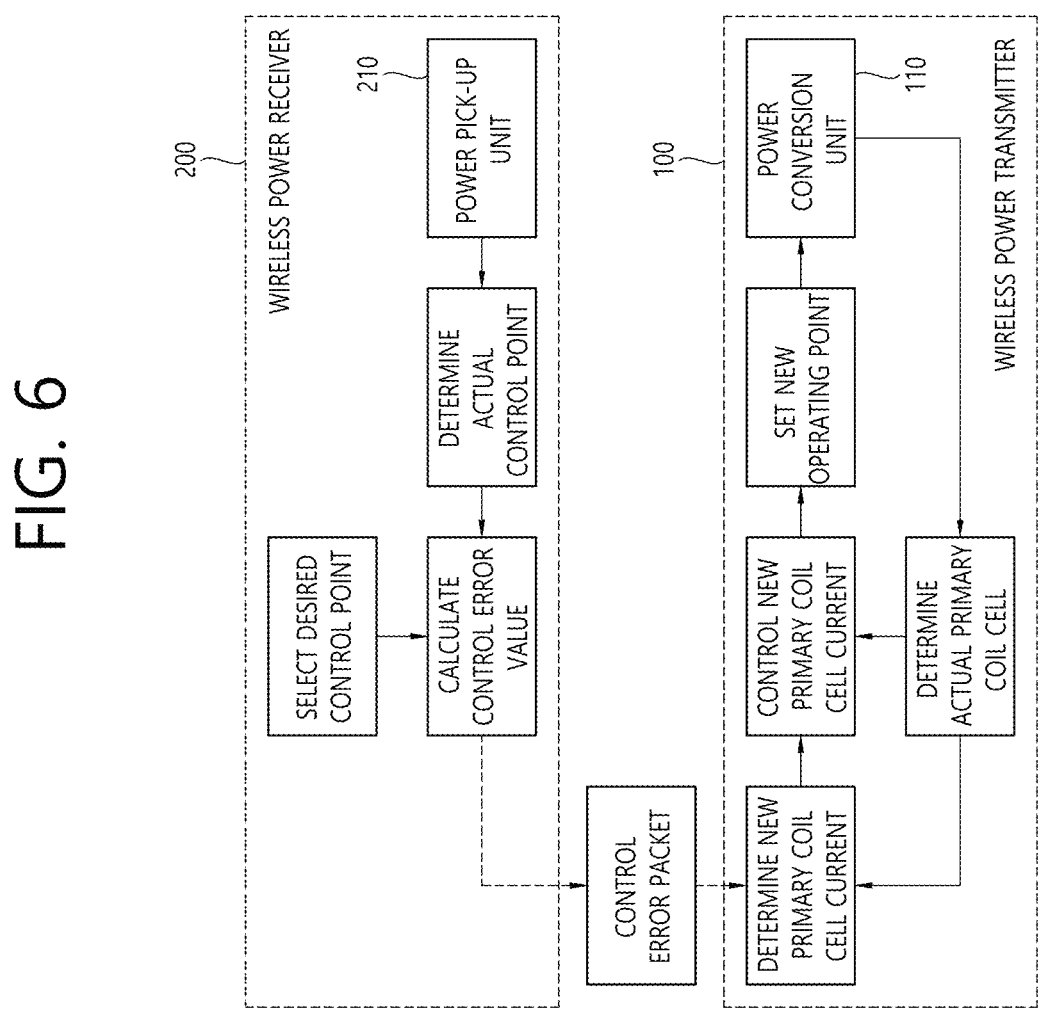

WIRELESS POWER RECEIVER

210

POWER PICK-UP UNIT

DETERMINE ACTUAL CONTROL POINT

SELECT DESIRED CONTROL POINT

CALCULATE CONTROL ERROR VALUE

CONTROL ERROR PACKET

100

WIRELESS POWER TRANSMITTER

110

POWER CONVERSION UNIT

SET NEW OPERATING POINT

CONTROL NEW PRIMARY COIL CELL CURRENT

DETERMINE ACTUAL PRIMARY COIL CELL

DETERMINE NEW PRIMARY COIL CELL CURRENT

FIG. 11

| | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved | | | | | Mode | | |
| $B_1$ | (msb) Estimated Received Power value (lsb) | | | | | | | |
| $B_2$ | | | | | | | | |

FIG. 12

| | $b_7$ | $b_6$ | $b_5$ | $b_4$ | $b_3$ | $b_2$ | $b_1$ | $b_0$ |
|---|---|---|---|---|---|---|---|---|
| $B_0$ | Setting Time | | Slot Length | | | Mode | | |
| $B_1$ | (mbs) Estimated Received Power value | | | | | | | |
| $B_2$ | | | | | | | | (lsb) |

FIG. 14

| | $b_7$ | $b_6$ | $b_5$ | $b_4$ | $b_3$ | $b_2$ | $b_1$ | $b_0$ |
|---|---|---|---|---|---|---|---|---|
| $B_0$ | Request | | | | | | | |
| $B_1$ | Reserved | | | | | Mode | | |

FIG. 15

| | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved | # of slot | | Slot length | | | Request | |
| $B_1$ | Parameter | | | | | | | |

DEVICE FOR TRANSMITTING WIRELESS POWER, METHOD FOR TRANSMITTING WIRELESS POWER, DEVICE FOR RECEIVING WIRELESS POWER, AND METHOD FOR RECEIVING WIRELESS POWER

CROSS-REFERENCE TO RELATED APPLICATIONS

This application is a Continuation of U.S. application Ser. No. 17/909,049, filed on Sep. 2, 2022, which is the National Phase of PCT International Application No. PCT/KR2021/002813, filed Mar. 8, 2021, which claims the benefit of Korean Patent Application No. 10-2020-0028591, filed Mar. 6, 2020 and Korean Patent Application No. 10-2020-0037320, filed Mar. 27, 2020, which are all hereby incorporated by reference herein in their entirety.

BACKGROUND OF THE DISCLOSURE

Field of the Disclosure

The present specification relates to a wireless power transmitter, a wireless power receiver for receiving wireless power from the wireless power transmitter, and a wireless power transmission method and wireless power reception method using the wireless power receiver and the wireless power transmitter.

Related Art

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

SUMMARY OF THE DISCLOSURE

An object of the present specification is to provide a wireless power transmitter, a wireless power transmitter, a wireless power receiver, a wireless power receiver, and a wireless charging system that perform power calibration for detecting a foreign object during power transfer.

The technical problems of the present specification are not limited to the problems mentioned above, and other problems not mentioned will be clearly understood by those skilled in the art from the following description.

A wireless power transmitter according to an embodiment of the present specification for solving the above problems transfers a wireless power to a wireless power receiver, the wireless power transmitter comprises a power conversion circuit configured to transfer the wireless power to the wireless power receiver and a communication/control circuit configured to communicate with the wireless power receiver and control the wireless power, receive, from the wireless power receiver, information on a received power value for two or more calibration points for a power calibration, and construct a power calibration curve for a foreign object detection based on the information on the received power value, wherein the communication/control circuit is configured to receive, from the wireless power receiver, a received power (RP) packet including information for a received power received by the wireless power receiver, transmit, to the wireless power receiver, a response pattern (ATN) requesting communication permission in response to the RP packet, receive, from the wireless power receiver, a data stream response (DSR) packet requesting a transmission of a data packet, and transmit the data packet requesting initiation of a power calibration protocol for updating the power calibration curve in response to the DSR.

A wireless power transmission method according to an embodiment of the present specification for solving the above problems transfers a wireless power to a wireless power receiver, the method comprises receiving, from the wireless power receiver, information on a received power value for two or more calibration points for a power calibration, constructing a power calibration curve for a foreign object detection based on the information on the received power value, receiving, from the wireless power receiver, a received power (RP) packet including information for a received power received by the wireless power receiver, transmitting, to the wireless power receiver, a response pattern (ATN) requesting communication permission in response to the RP packet, receiving, from the wireless power receiver, a data stream response (DSR) packet requesting a transmission of a data packet, and transmitting the data packet requesting initiation of a power calibration protocol for updating the power calibration curve in response to the DSR.

A wireless power receiver according to an embodiment of the present specification for solving the above problems receives a wireless power from a wireless power transmitter, and the wireless power receiver comprises a power pickup circuit configured to receive the wireless power from the wireless power transmitter and a communication/control circuit configured to communicate with the wireless power transmitter and control the wireless power, wherein the communication/control circuit is configured to transmit, to the wireless power transmitter, a received power (RP) packet including information for a received power received by the wireless power receiver, receive, from the wireless power transmitter, a response pattern (ATN) requesting communication permission in response to the RP packet, transmit, to the wireless power transmitter, a data stream response (DSR) packet requesting a transmission of a data packet, receive the data packet requesting initiation of a power calibration protocol for updating a power calibration curve for a foreign object detection in response to the DSR, based on the information included in the data packet, transmit an additional RP/2 packet including information on a received power value for an additional calibration point or transmit a first RP/1 packet including information on a received power value for a first calibration point.

A wireless power receiving method according to an embodiment of the present specification for solving the above problems receives a wireless power from a wireless power transmitter, the method comprises transmitting, to the wireless power transmitter, a received power (RP) packet including information for a received power received by the wireless power receiver, receiving, from the wireless power transmitter, a response pattern (ATN) requesting communication permission in response to the RP packet, transmitting, to the wireless power transmitter, a data stream response (DSR) packet requesting a transmission of a data packet, receiving the data packet requesting initiation of a power calibration protocol for updating a power calibration curve for a foreign object detection in response to the DSR, based on the information included in the data packet, transmitting an additional RP/2 packet including information on a received power value for an additional calibration point or transmitting a first RP/1 packet including information on a received power value for a first calibration point.

Other specific details of this specification are included in the detailed description and drawings.

During power transmission, the power calibration curve for foreign object detection may be updated according to the need of the wireless power transmitter.

Effects according to the present specification are not limited by the contents exemplified above, and more various effects are included in the present specification.

BRIEF DESCRIPTION OF THE DRAWINGS

FIG. 3*b* shows an example of a WPC NDEF in a wireless power transfer system.

FIG. 5 is a state transition diagram for describing a wireless power transfer procedure.

FIG. 6 shows a power control method according to an exemplary embodiment of the present disclosure.

FIG. 11 is a diagram showing the format of a message field of a received power packet according to an example.

FIG. 12 is a diagram illustrating a format of a message field of a received power packet according to another example.

FIG. 14 is a diagram illustrating a format of a message field of a power calibration request packet according to an embodiment.

FIG. 15 is a diagram illustrating a format of a message field of a power calibration request packet according to another embodiment.

DESCRIPTION OF EXEMPLARY EMBODIMENTS

In this specification, “A or B” may refer to “only A”, “only B” or “both A and B”. In other words, “A or B” in this specification may be interpreted as “A and/or B”. For example, in this specification, “A, B, or C” may refer to “only A”, “only B”, “only C”, or any combination of “A, B and C”.

The slash (/) or comma used in this specification may refer to “and/or”. For example, “A/B” may refer to “A and/or B”. Accordingly, “A/B” may refer to “only A”, “only B”, or “both A and B”. For example, “A, B, C” may refer to “A, B, or C”.

In this specification, “at least one of A and B” may refer to “only A”, “only B”, or “both A and B”. In addition, in this specification, the expression of “at least one of A or B” or “at least one of A and/or B” may be interpreted to be the same as “at least one of A and B”.

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDCCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
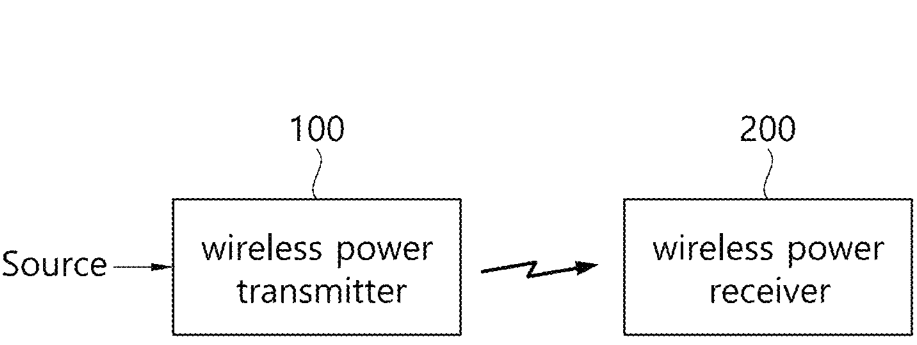
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source(S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
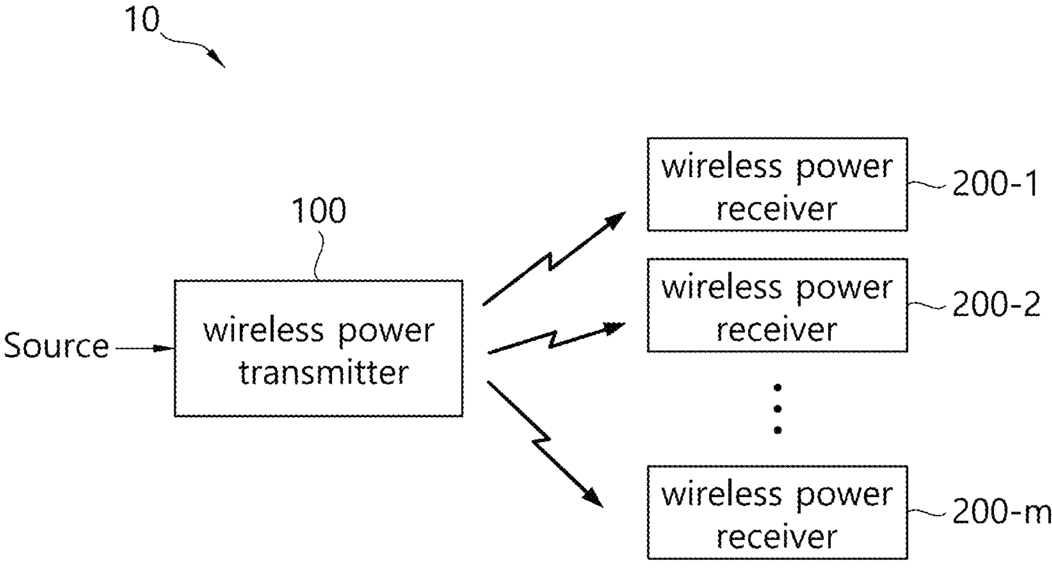
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
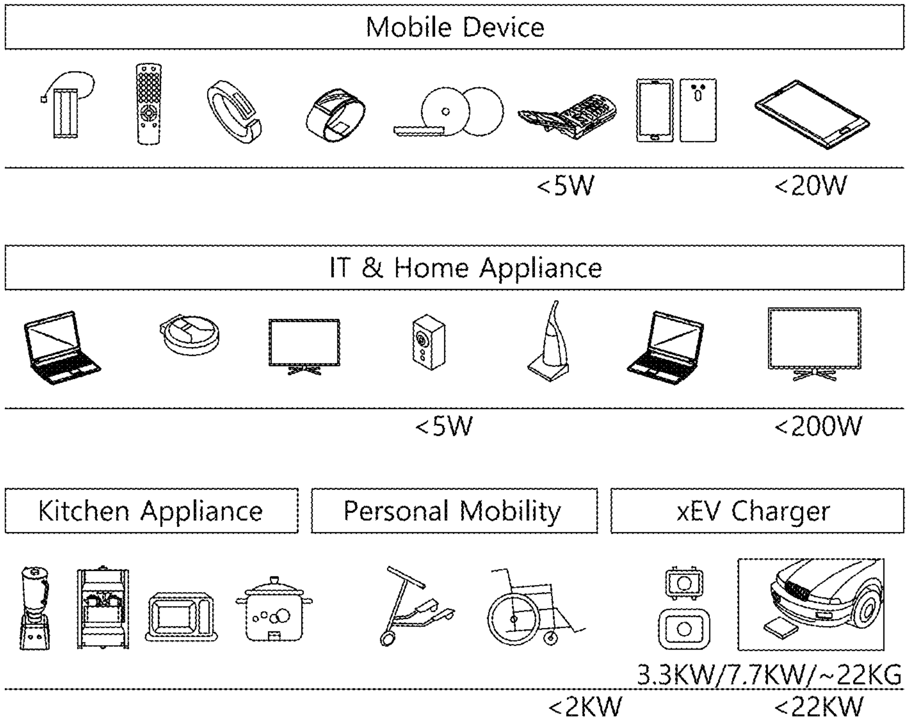
FIG. 3*a* shows an exemplary embodiment of diverse electronic devices adopting a wireless power transfer system.

FIG. 3*a* shows an exemplary embodiment of diverse electronic devices adopting a wireless power transfer system.

As shown in FIG. 3*a*, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 3*b* shows an example of a WPC NDEF in a wireless power transfer system.

Referring to FIG. 3*b*, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1× Category 1 | 1× Category 1 |
| Class 2 | 10 W | 1× Category 3 | 2× Category 2 |
| Class 3 | 16 W | 1× Category 4 | 2× Category 3 |
| Class 4 | 33 W | 1× Category 5 | 3× Category 3 |
| Class 5 | 50 W | 1× Category 6 | 4× Category 3 |
| Class 6 | 70 W | 1× Category 7 | 5× Category 3 |

TABLE 2

| PRU | $P_{RX\_OUT\_MAX'}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4A:
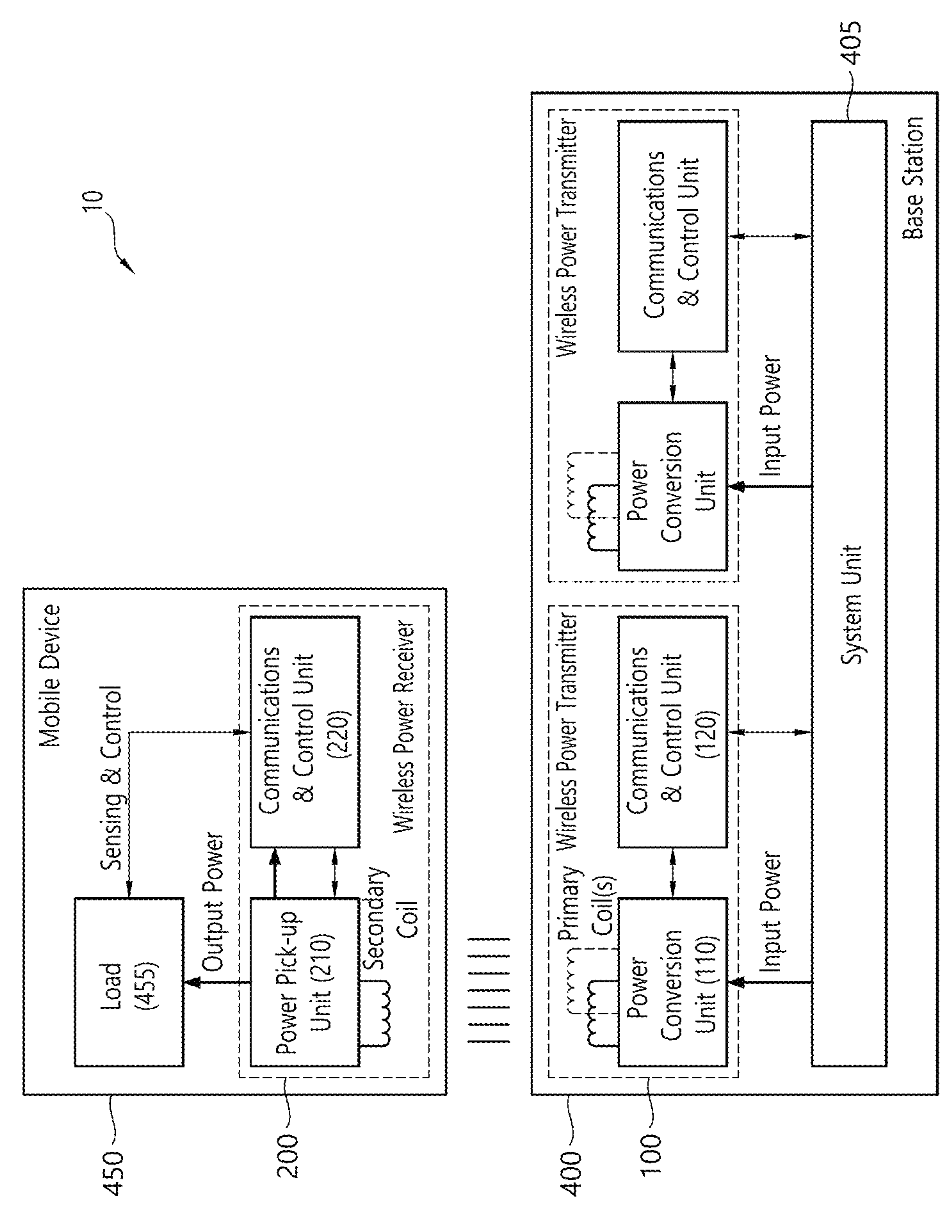
FIG. 4*a* is a block diagram of a wireless power transfer system according to another exemplary embodiment of the present disclosure.

FIG. 4*a* is a block diagram of a wireless power transfer system according to another exemplary embodiment of the present disclosure.

Referring to FIG. 4*a*, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4*a*, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Referring to FIG. 4*a*, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 4B:
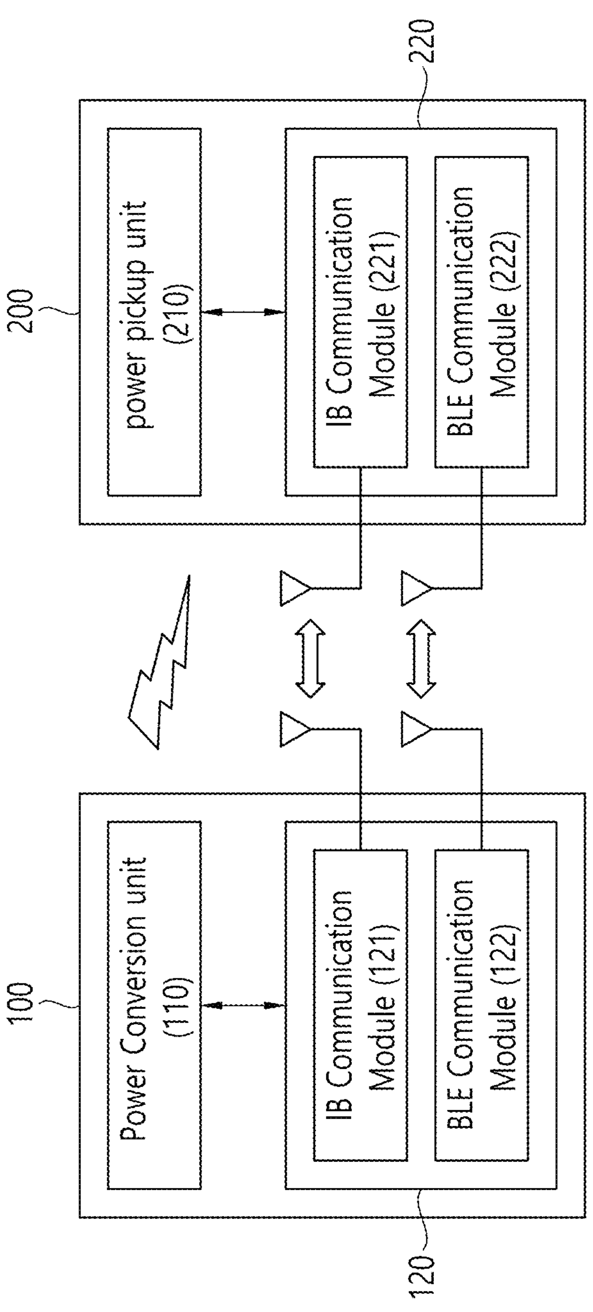
FIG. 4*b* is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 4*b*.

FIG. 4*b* is a block diagram illustrating a wireless power transfer system using BLE communication according to an example.

Referring to FIG. 4*b*, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 4*b*. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 4C:
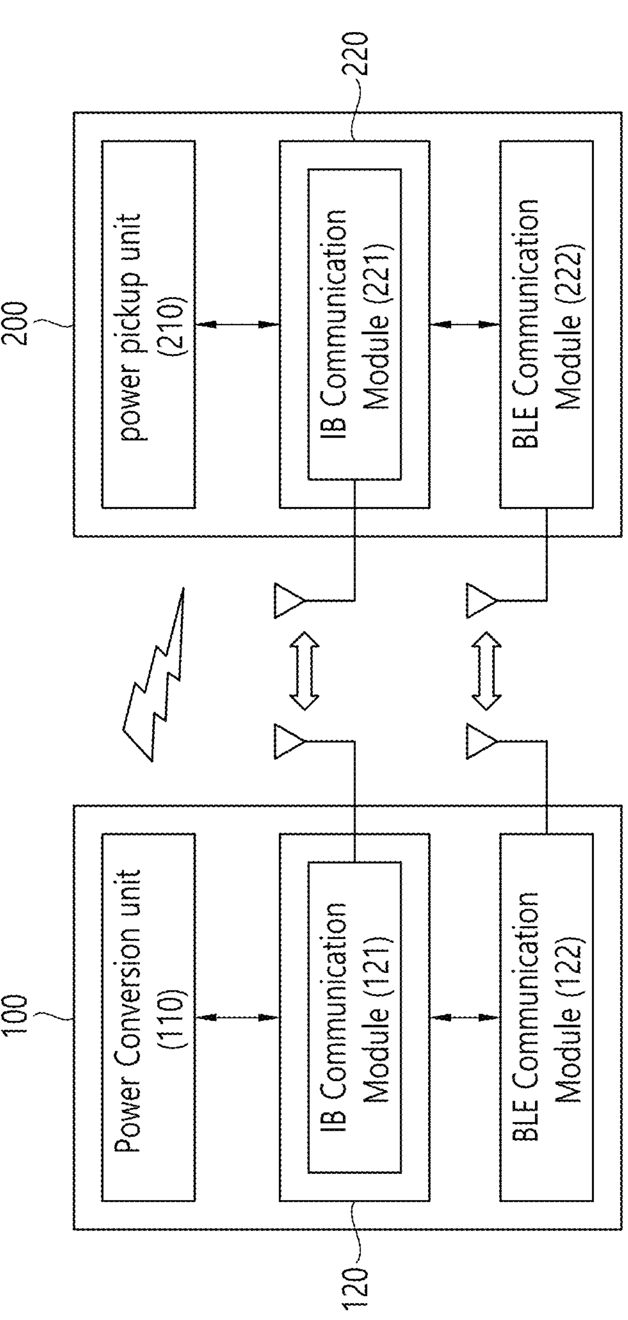
FIG. 4*c* is a block diagram illustrating a wireless power transfer system using BLE communication according to another example.

FIG. 4*c* is a block diagram illustrating a wireless power transfer system using BLE communication according to another example.

Referring to FIG. 4*c*, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the identifying and configuring step 530 may also be referred to as a configuration step.

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
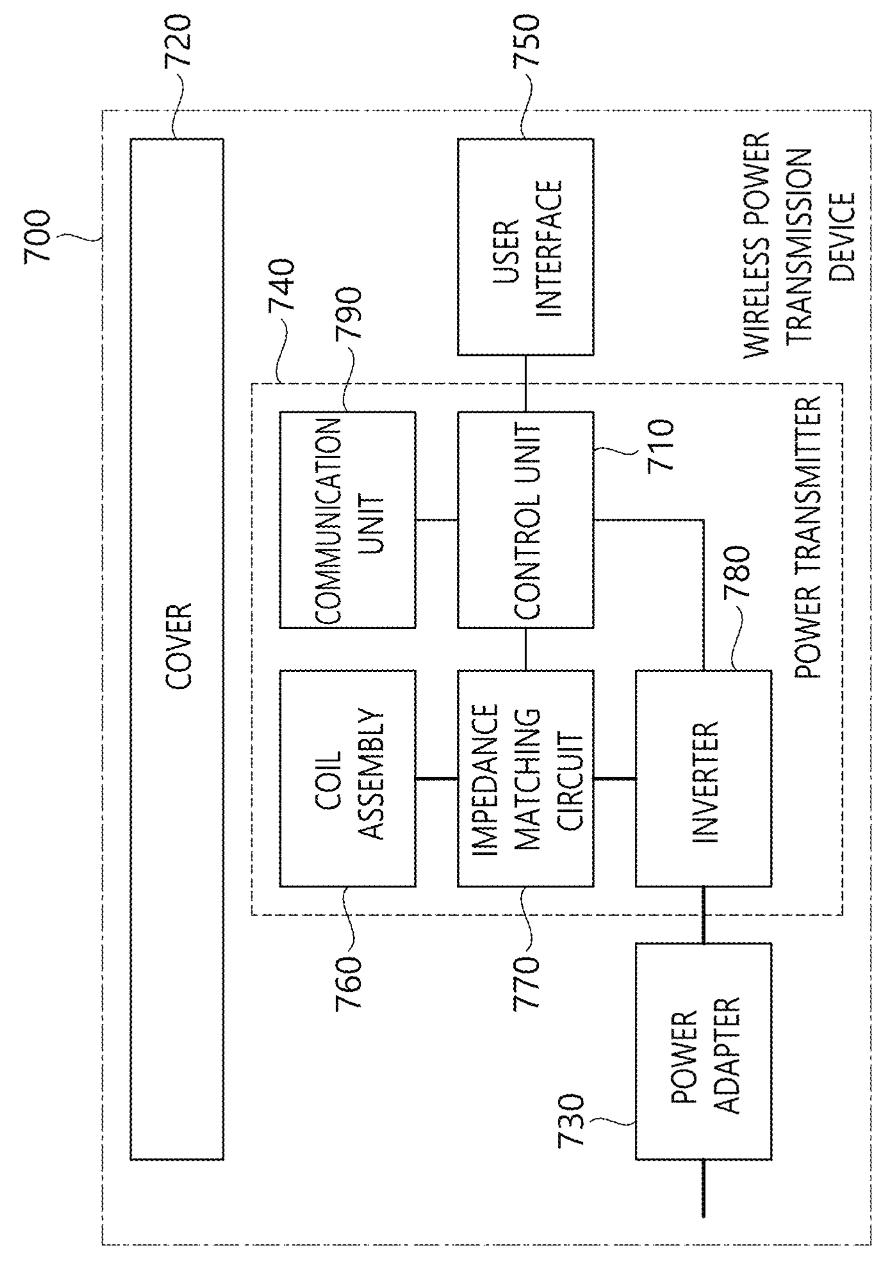
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
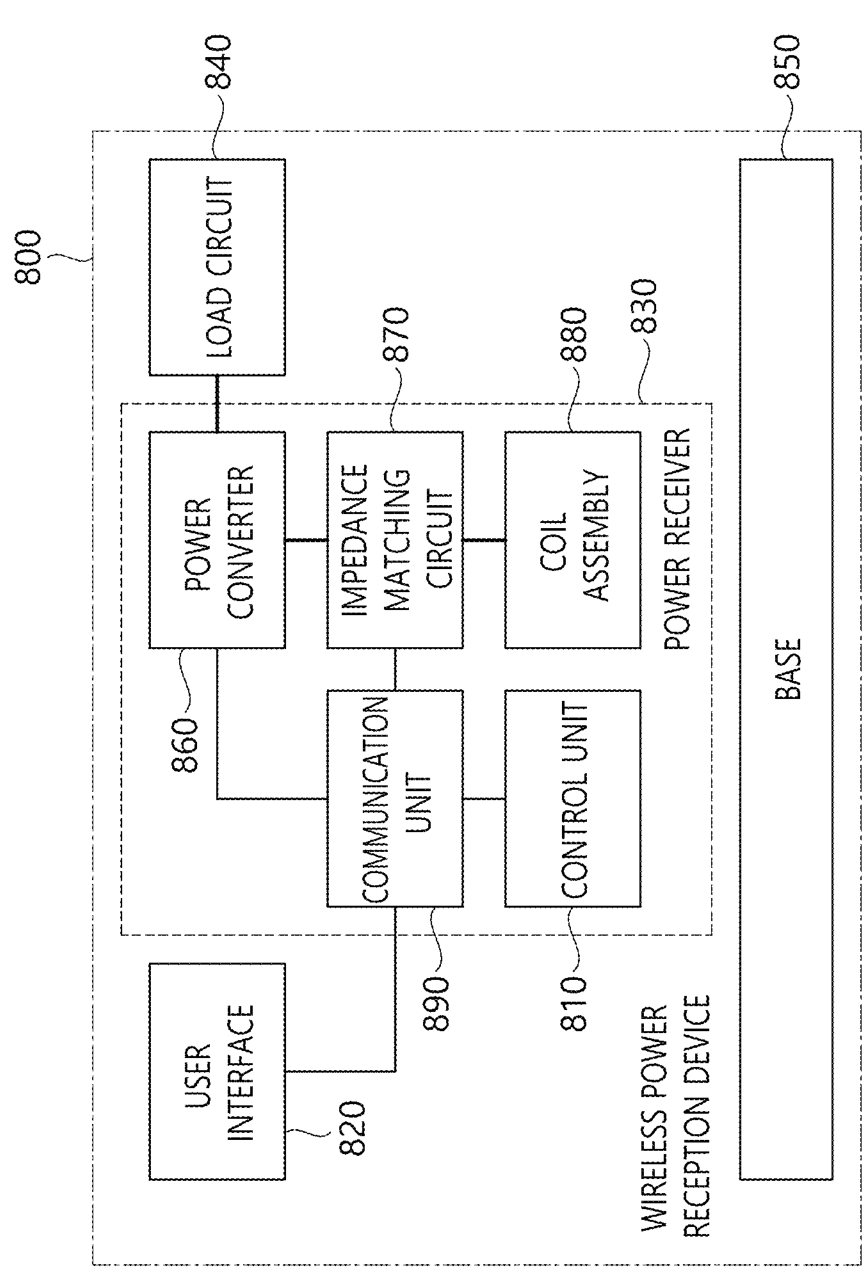
FIG. 8 shows a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

Hereinafter, foreign object detection in the power transmission step and power calibration according to the foreign object detection result will be described.

When a wireless power transmitter transmits wireless power to a wireless power receiver using a magnetic field, if a foreign object is present therearound, a part of magnetic field may be absorbed to the foreign object. That is, a part of the wireless power transmitted from the wireless power transmitter is supplied to the foreign object and the rest is supplied to the wireless power receiver. From the viewpoint of the efficiency of power transfer, loss of transmitted power occurs as much as power or energy absorbed by the foreign object. Thus, since a causal relationship may be established between the presence of the foreign object and power loss (Ploss), the wireless power transmitter may detect how much power loss occurs through the foreign object. Such a foreign object detection method may be referred to as a foreign object detection method based on power loss.

The power lost by the foreign object may be defined as a value obtained by subtracting the power actually received by the wireless power receiver ($P_{received}$) from the power ($P_{transmitted}$) transmitted by the wireless power transmitter. From the standpoint of the wireless power transmitter, since it knows the transmitted power ($P_{transmitted}$), if the wireless power receiver knows the actual received power ($P_{received}$), the power loss can be calculated. To this end, the wireless power receiver may periodically transmit a received power data packet (RP) to the wireless power transmitter and inform the wireless power transmitter of the power received by the wireless power receiver ($P_{received}$).

Meanwhile, the wireless power transmitter and the wireless power receiver include various circuit components therein and configure devices independent of each other. However, since wireless power is transmitted by magnetic coupling therebetween, the wireless power transmitter and the wireless power receiver constitute one wireless power transfer system. In addition, the amount of power (transmitted power) transmitted by the wireless power transmitter and the amount of power (received power) received by the wireless power receiver are uniquely determined by the power transfer characteristics. As an example, power transfer characteristics may be considered as a ratio or function of transmitted power and received power. Therefore, if the wireless power transmitter knows the power transfer characteristics in advance, the wireless power transmitter may be able to predict how much of the power transmitted by the wireless power transmitter will be received by the wireless power receiver. If actual received power reported by the wireless power receiver is smaller than received power predicted based on the power transfer characteristics, it may be considered that power loss occurred in the power transfer process. The foreign object detection method based on power loss may determine that a foreign object exists in the above case. As described above, power loss used for the determination of a foreign object is also determined based on the power transfer characteristics, and therefore, power transfer characteristics need to be properly recognized to increase reliability of foreign object detection.

The power transfer characteristic is dependent on an environment in which wireless power is transmitted or a unique characteristic of a device transmitting wireless power. The wireless power transmitter and the wireless power receiver may generally use power calibration at the start of wireless power transfer to determine the power transfer characteristics in a certain currently given wireless charging environment. When the power transfer characteristics are identified or set by power calibration, foreign object detection is performed accordingly.

Figure 9:
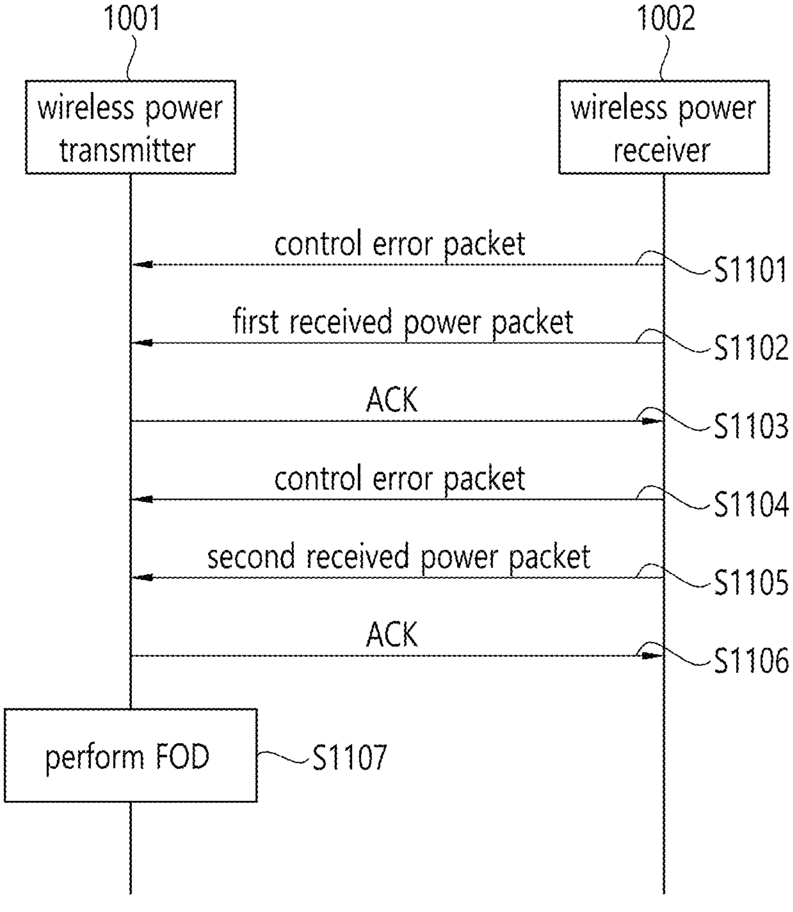
FIG. 9 is a flowchart for explaining a dual point power calibration method.
Figure 10:
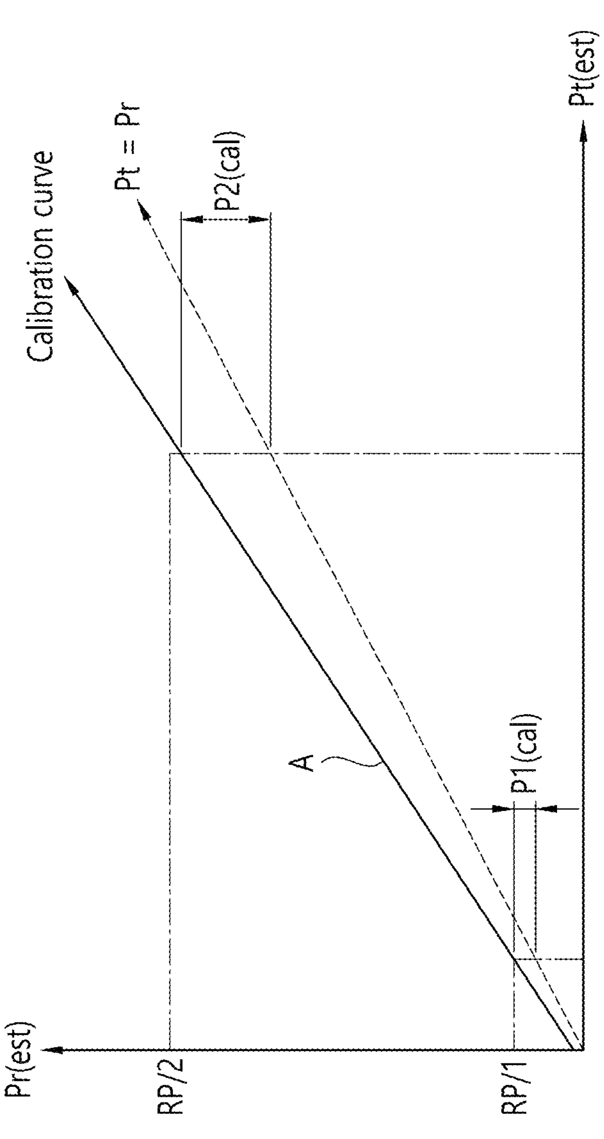
FIG. 10 is a graph showing an example of a power calibration curve by a double-point power calibration method.

FIG. 9 is a flowchart for explaining a dual point power calibration method, FIG. 10 is a graph showing an example of a power calibration curve by a double-point power calibration method, FIG. 11 is a diagram showing the format of a message field of a received power packet according to an example, and FIG. 12 is a diagram illustrating a format of a message field of a received power packet according to another example.

Referring to FIG. 9, at the beginning of the power transfer phase, the power calibration protocol proceeds, the wireless power receiver 1002 transmits a first receive power packet (RP/1) and a second receive power packet (RP/2), it enables the wireless power transmitter 1001 to construct a double-point power calibration curve.

More specifically, the wireless power receiver 1002 transmits a control error packet (CE) to the wireless power transmitter (S1101), a first received power packet (RP/1) including information on a first calibration data point (first calibration data point) is transmitted to the wireless power transmitter (S1102).

The control error packet includes a control error value. The control error value includes information about a deviation between a target operating point and an actual operating point of the wireless power receiver 1002. For example, if the control error value is positive, it means that the actual operating point is lower than the target operating point, the wireless power transmitter 1001 receiving this may increase the power of the wireless power to be transmitted. Conversely, if the control error value is negative, it means that the actual operating point is higher than the target operating point, the wireless power transmitter 1001 receiving this may lower the power of the wireless power to be transmitted.

Referring to FIG. 11 or FIG. 12, the first received power packet RP/1 includes a Mode field and an Estimated Received Power Value field. Through the value (e.g., 1) of the mode field of the first received power packet (RP/1), the wireless power transmitter 1001 can confirm that the received power packet (RP) received from the wireless power receiver 1002 is the first received power packet (RP/1) including information about the first calibration data point, and the first calibration data point may be confirmed through the value of the estimated received power value field of the first received power packet (RP/1).

The first calibration data point is a starting point of the power calibration curve, and may be a power level corresponding to about 10% of a reference power level of a power transfer contract established in the negotiation phase.

The wireless power transmitter 1001 determines whether the wireless power receiver 1002 has reached a desired target operating point based on the control error value included in the control error packet, and it responds with ACK or NAK to the first received power packet (RP/1) (S1103). More specifically, the wireless power transmitter 1001 determines whether the power level is stabilized at the first calibration data point based on the control error value. For example, when the control error value is less than 3, the wireless power transmitter 1001 determines that the power level is stabilized and the wireless power receiver 1002 reaches the desired target operating point, it may respond with ACK to the first received power packet (RP/1). If the control error value is less than 3, it is determined that the power level is not stabilized and the wireless power receiver 1002 has not reached the desired target operating point, the wireless power transmitter 1001 may respond with a NAK to the first received power packet (RP/1).

The wireless power receiver 1002 continues to transmit the first received power packet (RP/1) until it receives an ACK from the wireless power transmitter 1001 (S1102). In addition, so that the power level can be stabilized at the first calibration data point, the wireless power receiver 1002 also repeatedly transmits the control error packet to the wireless power transmitter 1001 (S1101).

After the power level is stabilized at the first calibration data point, and the ACK for the first received power packet (RP/1) is received from the wireless power transmitter 1001 (S1103), it transmits the control error packet to the wireless power transmitter (S1104), and the wireless power receiver 1002 transmits a second received power packet (RP/2) including information on a second calibration data point to the wireless power transmitter 1001 (S1105).

The second received power packet RP/2 also includes a Mode field and an Estimated Received Power Value field (refer to FIG. 11 or FIG. 12). Through the value (e.g., 0) of the mode field of the second received power packet (RP/2), the wireless power transmitter 1001 can confirm that the received power packet (RP) received from the wireless power receiver 1002 is the second received power packet (RP/2) including information on the second calibration data point, and the second calibration data point may be confirmed through the value of the estimated received power value field of the second received power packet (RP/2).

The second calibration data point is a point for constructing a power calibration curve, and may be a power level close to the reference power level of the power transfer contract established in the negotiation stage.

The wireless power transmitter 1001 determines whether the wireless power receiver 1002 has reached a desired target operating point based on the control error value included in the control error packet, and it responds with ACK or NAK to the second received power packet (RP/2) (S1106). More specifically, the wireless power transmitter 1001 determines whether the power level is stabilized at the second calibration data point based on the control error value. For example, when the control error value is less than 3, the wireless power transmitter 1001 determines that the power level is stabilized and the wireless power receiver 1002 reaches the desired target operating point, it may respond with ACK to the second received power packet (RP/2) (S1106). If the control error value is less than 3, it is determined that the power level is not stabilized and the wireless power receiver 1002 has not reached the desired target operating point, the wireless power transmitter 1001 may respond with a NAK to the second received power packet (RP/2).

The wireless power receiver 1002 continues to transmit the second received power packet RP/2 until it receives an ACK from the wireless power transmitter 1001 (S1105). In addition, so that the power level can be stabilized at the second calibration data point, the wireless power receiver 1002 also repeatedly transmits the control error packet to the wireless power transmitter 1001 (S1104).

After the power level is stabilized at the second calibration data point, and the ACK for the second received power packet (RP/2) is received from the wireless power transmitter 1001 (S1106), the wireless power receiver 1002 and the wireless power transmitter 1001 enter a normal power transmission mode. The wireless power transmitter 1001 constructs a power calibration curve based on the first received power packet (RP/1) and the second received power packet (RP/2) that have transmitted the ACK (refer to FIG. 10), using this, it is possible to perform foreign object detection based on transmission power loss (S1107).

More specifically, the wireless power transmitter 1001 receives a received power packet (eg, RP/0 in which the mode field value is 0) from the wireless power receiver 1002 during power transmission, it confirms the received power value received by the wireless power receiver 1002 through the received power packet, if the difference between the calibrated power calculated by applying the transmit power value to the power calibration curve and the received power value confirmed through the received power packet is greater than or equal to the threshold, it can be estimated that power loss has occurred by the foreign object.

A power calibration curve constructed by the above-described dual-point power calibration method will be described with reference to FIG. 10.

The wireless power transmitter 1001 constructs a power calibration curve (A) based on the first received power packet (RP/1) and the second received power packet (RP/2) that have transmitted the ACK.

If the estimated value of the transmit power is Pt(est), the estimated value of the received power is Pr(est), the actual transmit power value is Pt, and the actual received power value is Pr, and when it is confirmed that there is no foreign object between the wireless power transmitter and the wireless power receiver through foreign object detection (pre-power FOD) before power transmission, the following [Equation 1] can be established.

$$Pt(est) + \delta Pt = Pt = Pr = Pr(est) - \delta Pr \quad \text{[Equation 1]}$$

Here, δPt is a prediction error value of transmission power, and may include a power loss value of the wireless power transmitter itself. δPr is a prediction error value of the received power, and may include a power loss value of the wireless power receiver itself.

Based on [Equation 1], the calibrated power value P(cal) may be calculated by the following [Equation 2].

$$P(\text{cal}) = \delta Pt + \delta Pr = Pr(est) - Pt(est) \quad \text{[Equation 2]}$$

Therefore, when RP/1 (first calibration data point) and RP/2 (second calibration data point) are substituted into Equation 2, the calibrated power value can be expressed as in the following [Equation 3], respectively.

$$P1(\text{cal}) = RP/1 - Pt1(est)$$
$$P2(\text{cal}) = RP/2 - Pt2(est) \quad \text{[Equation 3]}$$

That is, if it is confirmed that there is no foreign object by the pre-power FOD, the same relationship in Equations 1 to 3 is established, a calibration curve based on Equations 1 to 3 may be shown as a graph (A) as shown in FIG. 10.

However, the power transmission characteristics may also depend on a change in a load or a change in the degree of magnetic coupling. For example, when the wireless power receiver uses multiple load steps or a load variable (or increases the load), or the degree of magnetic coupling changes due to a change in location between the wireless power transmitter and the receiver, at least some of the power transfer characteristics may change. When at least a part of the power transmission characteristic is changed, at least a part of the power calibration set according to the previous power transmission characteristic becomes invalid. In addition, power loss and foreign object detection according to at least some of the set power calibration are no longer valid. Therefore, additional power calibration is required to match the changed power transmission characteristics.

Accordingly, the power calibration protocol for updating the initial power calibration curve configured at the start of the above-described power transfer phase needs to be performed while the power transfer phase is in progress.

In addition, when the existence of a foreign object is suspected in the power transfer phase, the wireless power transmitter 1001 may update the power calibration curve for detecting the foreign object at a time desired by the wireless power transmitter 1001.

Hereinafter, a method of updating the power calibration curve by the wireless power transmitter 1001 will be described.

(1) Construction of Extended Power Calibration Curve

Figure 13:
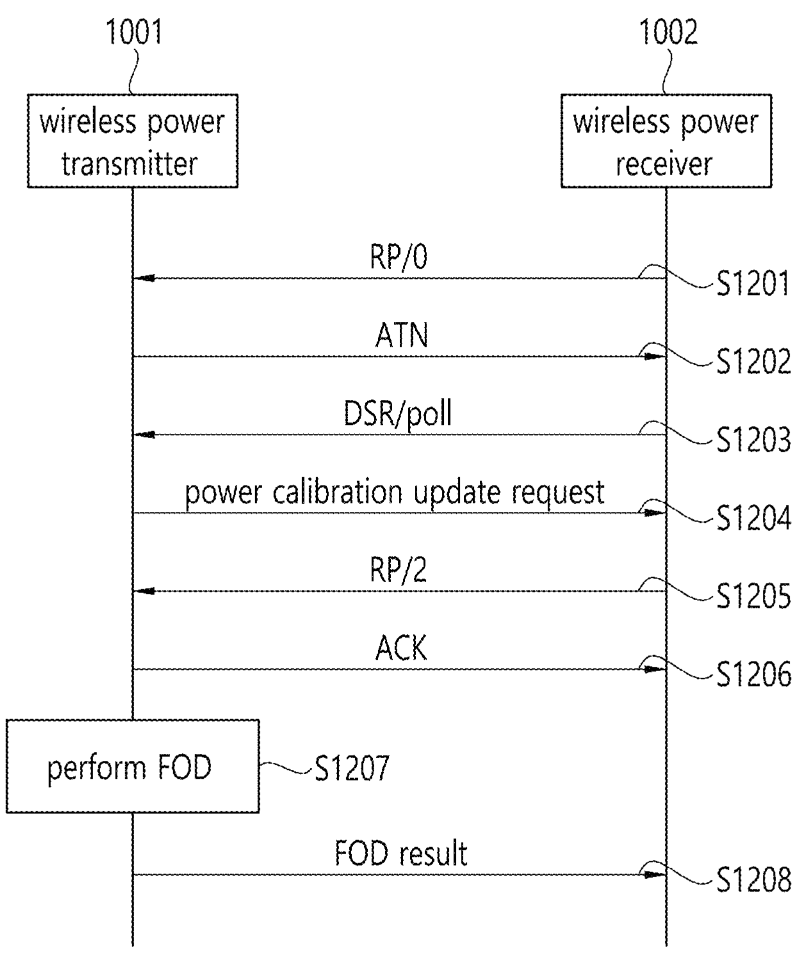
FIG. 13 is a flowchart illustrating a power calibration protocol for constructing an extended power calibration curve according to an embodiment.

FIG. 13 is a flowchart illustrating a power calibration protocol for constructing an extended power calibration curve according to an embodiment.

Each step shown in FIG. 13 may be performed in a power transfer phase. Before entering the power transfer phase, the wireless power transmitter 1001 and the wireless power receiver 1002 may have entered a power transfer phase (Power Transfer Phase) through a ping phase, a configuration phase, and a negotiation phase.

After entering the power transfer phase, the wireless power transmitter 1001 provides wireless power according to the power transfer contract established in the negotiation phase to the wireless power receiver 1002.

Referring to FIG. 13, the wireless power receiver 1002 enters the power transfer phase, as information about the wireless power received from the wireless power transmitter 1001, a received power packet (RP/0) is transmitted to the wireless power transmitter 1001 (S1201). The received power packet (RP/0) transmitted in step S1201 may be a received power packet in which the value of the mode field is set to 0, RP/0 includes information on the estimated received power value of the wireless power received by the wireless power receiver 1002 (refer to FIG. 11 or FIG. 12).

When the wireless power transmitter 1001 determines that foreign object detection is necessary, the wireless power transmitter 1001 may transmit an ATN response pattern to the wireless power receiver 1002 in response to the RP/0 packet transmitted by the wireless power receiver 1002 (S1202). ATN response pattern is an 8-bit response pattern ('11001100' b), when there is a data packet to be transmitted by the wireless power transmitter 1001, etc., it may be used to request a communication right to the wireless power receiver 1002.

In order to request transmission of a data packet to the wireless power transmitter 1001, the wireless power receiver 1002 receiving the ATN transmits a data stream response packet (DSR/poll) to the wireless power transmitter 1001 (S1203). DSR/poll is a type of data stream response packet (DSR) transmitted by the wireless power receiver 1002, it has an 8-bit message field, a value of 0x33 may be set in the corresponding message field.

The wireless power transmitter 1001 that has received the DSR/poll from the wireless power receiver 1002 may transmit a data packet requesting the start of the power calibration protocol (hereinafter, a power calibration request packet) to the wireless power receiver 1002 (S1204).

FIG. 14 is a diagram illustrating a format of a message field of a power calibration request packet according to an embodiment.

Referring to FIG. 14, the power calibration request packet according to an embodiment may include a byte (B0) including a request field and a byte (B1) including a mode field.

The request field may include header information of a message (data packet) that the wireless power transmitter 1001 requests to be transmitted from the wireless power receiver 1002. Since the wireless power transmitter 1001 needs to receive a received power packet (RP) from the wireless power receiver 1002 in order to perform power calibration, the request field may include 0x31, which is a header value of the RP.

The mode field may include a mode value of a received power packet (RP) that the wireless power transmitter 1001 requests to be transmitted from the wireless power receiver 1002. For example, when the wireless power transmitter 1001 intends to receive the received power packet (RP/1) of mode 1 including information on the first calibration data point, the value of the mode field of the power calibration request packet may be set to 1, and when the wireless power transmitter 1001 intends to receive the received power packet (RP/2) of mode 2 including information on the second calibration data point, the value of the mode field of the power calibration request packet may be set to 2.

Step S1204, since it is premised on the case that the wireless power transmitter 1001 wants to start the power calibration protocol for constructing the extended power calibration curve, the wireless power transmitter 1001 may transmit a power calibration request packet in which the value of the mode field is set to 2 to the wireless power receiver 1002.

FIG. 15 is a diagram illustrating a format of a message field of a power calibration request packet according to another embodiment.

Referring to FIG. 15, a power calibration request packet according to another embodiment may include a request field.

The request field may include information on the type of power calibration protocol desired by the wireless power transmitter 1001.

The power calibration protocol after the initial power calibration protocol (refer to FIG. 9) may include the extended power calibration protocol that updates the power calibration curve by extending the power calibration curve constructed in the initial power calibration protocol (see FIG. 13) and the power recalibration protocol (refer to FIG. 17) of deleting the power calibration curve constructed in the initial power calibration protocol and constructing a new power calibration curve to update the power calibration curve.

The value of the request field of the power calibration request packet of FIG. 15 may be set differently depending on whether the power calibration protocol desired by the wireless power transmitter 1001 is an extended power calibration protocol or a power recalibration protocol. For example, in step S1204, when the wireless power transmitter 1001 wants to start the power recalibration protocol (or if it wants to receive the received power packet (RP/1) having a mode value of 1), it may transmit a power calibration request packet in which the value of the request field is set to 1 ('01'b) to the wireless power receiver 1002, when the wireless power transmitter 1001 wants to start the extended power calibration protocol (or if it wants to receive a reception power packet (RP/2) having a mode value of 2), it may transmit a power calibration request packet in which the value of the request field is set to 2 ('10'b) to the wireless power receiver 1002. Alternatively, in step S1204, when the wireless power transmitter 1001 wants to start the power recalibration protocol, the wireless power receiver 1002 sends a power calibration request packet in which the value of the request field is set to 2 ('10'b). If the wireless power transmitter 1001 wants to start the extended power calibration protocol, a power calibration request packet in which the value of the request field is set to 1 ('01'b) may be transmitted to the wireless power receiver 1002. The request field may consist of 2 bits, depending on whether the power calibration protocol desired by the wireless power transmitter 1001 is an extended power calibration protocol or a power recalibration protocol, the value of the request field may be set to any one of 0 to 4 values that can be expressed with 2 bits.

Step S1204, since it is premised on the case that the wireless power transmitter 1001 wants to start the power calibration protocol for constructing the extended power calibration curve, the wireless power transmitter 1001 may transmit a power calibration request packet in which the value of the request field is set to a value indicating the extended power calibration protocol to the wireless power receiver 1002.

Referring back to FIG. 15, a power calibration request packet according to another embodiment may be used as a slot request packet for foreign object detection (FOD). To this end, the power calibration request packet includes a number of slots field (# of slot) and a slot length field in addition to the request field.

The slot for detecting a foreign object means a time during which the wireless power transmitter 1001 temporarily suspends power transmission to detect a foreign object and detects a foreign object during power transmission.

The number of slots field may include information on the number of slots required for the wireless power transmitter 1001 to detect a foreign object or a minimum value of the number of slots. The slot length field may include information on the length (time) of the slot required for foreign object detection or the minimum value of the slot length.

Referring to FIG. 15, the number of slots field may be composed of 2 bits and the slot length field may be composed of 3 bits, but this is only an example, and the number of bits constituting each field may be changed.

The value of the slot length field may be set to mean, for example, '000'b to no slot required, '001'b to 100 μs, '010'b to 110 μs, and '011'b to 120 μs. This is only one example, and the correlation between the value of the slot length field and the actually required length of the slot may be variously changed.

On the other hand, when the power calibration request packet is used as a slot request packet for foreign object detection, the request field may have a different value than when the wireless power transmitter 1001 is an extended power calibration protocol or a power recalibration protocol is desired. For example, when the power calibration request packet is used as a slot request packet for foreign object detection, the request field may be set to 0.

Referring back to FIG. 13, the wireless power receiver 1002 that has received the power calibration request packet transmits RP/1 or RP/2 based on the power calibration request packet.

That is, when the wireless power receiver 1002 receives the power calibration request packet having the message field of FIG. 14, RP/1 or RP/2 may be transmitted to the wireless power transmitter 1001 based on the value of the mode field. For example, when the value of the mode field is 1, RP/1 having the mode value 1 may be transmitted, and when the value of the mode field is 2, an additional received power packet (RP/2) having the mode value 2 may be transmitted.

However, since the power calibration protocol described with reference to FIG. 13 is a power calibration protocol for constructing an extended power calibration curve, on the premise that the wireless power transmitter 1001 transmits a power calibration request packet in which the value of the mode field is set to 2 in step S1204, the wireless power receiver 1002 transmits to the wireless power transmitter 1001 an additional receive power packet (RP/2) including estimated received power value information, which is a third calibration data point (S1205).

When the wireless power receiver 1002 receives the power calibration request packet having the message field of FIG. 15, RP/1 or RP/2 may be transmitted to the wireless power transmitter 1001 based on the value of the request field. That is, when the value of the request field indicates the power recalibration protocol, the wireless power receiver 1002 may transmit RP/1, when the value of the request field indicates the extended power calibration protocol, the wireless power receiver 1002 may transmit RP/1.

However, since the power calibration protocol described with reference to FIG. 13 is a power calibration protocol for constructing an extended power calibration curve, on the premise that the wireless power transmitter 1001 has transmitted a power calibration request packet having a value of the request field indicating the extended power calibration protocol in step S1204, the wireless power receiver 1002 transmits an additional received power packet (RP/2) to the wireless power transmitter 1001 (S1205).

Although not shown, the wireless power receiver 1002 may transmit a control error packet before transmitting the additional received power packet (RP/2) in step S1205, the wireless power transmitter 1001 determines whether the wireless power receiver 1002 has reached a desired target operating point based on the control error value included in the control error packet, and it responds with ACK or NAK to the additional received power packet (RP/2) (S1206). For example, when the control error value is less than 3, the wireless power transmitter 1001 determines that the power level is stabilized and the wireless power receiver 1002 reaches the desired target operating point, it may respond with ACK to the additional received power packet (RP/2) (S1206). If the control error value is less than 3, it is determined that the power level is not stabilized and the wireless power receiver 1002 has not reached the desired target operating point, the wireless power transmitter 1001 may respond with a NAK to the additional received power packet (RP/2). The wireless power receiver 1002 may continue to transmit the additional received power packet (RP/2) and the control error packet until it receives the ACK from the wireless power transmitter 1001.

After the ACK for the additional received power packet (RP/2) is transmitted/received (S1206), the wireless power receiver 1002 and the wireless power transmitter 1001 may enter a normal power transmission mode.

The wireless power transmitter 1001 extends the existing power calibration curve based on the additional received power packet (RP/2) that has transmitted the ACK (refer to FIG. 16), it may perform foreign object detection based on the loss of transmission power using the extended power calibration curve (S1207).

The wireless power transmitter 1001 that has detected the foreign object may transmit the foreign object detection result to the wireless power receiver 1002 (S1208). The foreign object detection result may be expressed as ACK or NAK. That is, if it is determined that there is no foreign object as a result of performing foreign object detection, the wireless power transmitter 1001 transmits an ACK to the wireless power receiver 1002, if it is determined that a foreign object exists, the wireless power transmitter 1001 may transmit a NAK to the wireless power receiver 1002.

When it is determined that there is no foreign object, the wireless power transmitter 1001 and the wireless power receiver 1002 may continuously maintain a power transfer phase.

If it is determined that a foreign object exists, the wireless power receiver 1002 maintains an existing operation point and receives power according to an existing power transmission contract, it is switched to low power mode with receive power of 5 W or less, it stops the power transfer phase by transmitting an End Power transfer data packet (EPT) to the wireless power transmitter 1001, it resets the wireless power transmitter 1001, or it initializes a protocol for wireless power transfer so that foreign object detection (pre-power transfer FOD) is performed before power transfer.

Figure 16:
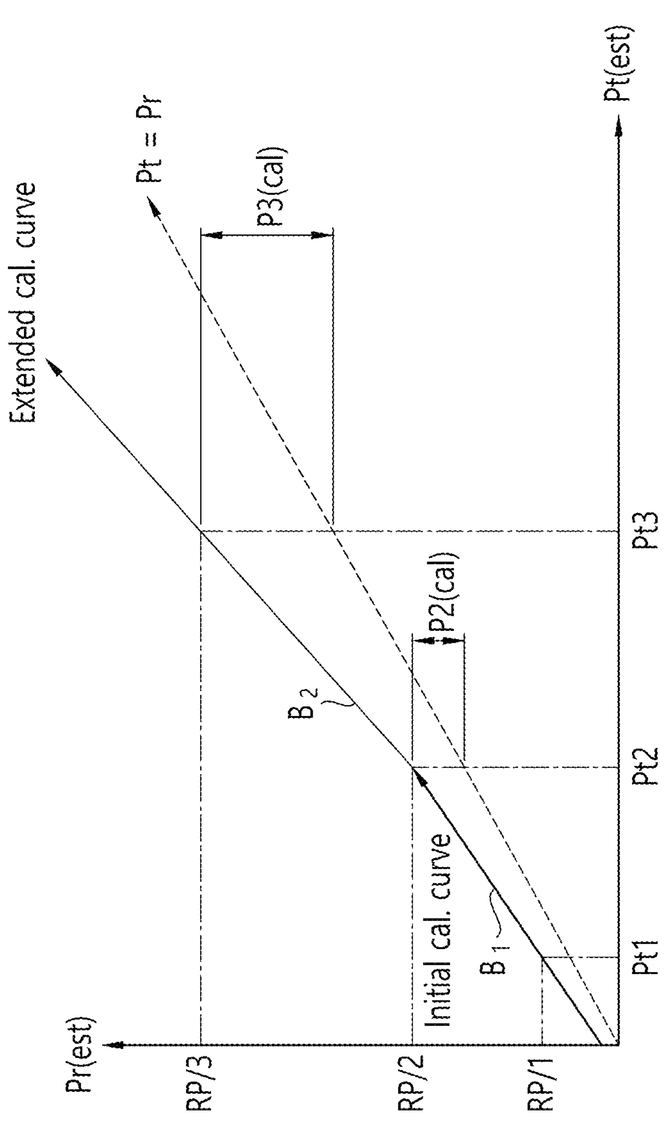
FIG. 16 is a diagram illustrating an example of an extended power calibration curve constructed through an extended power calibration protocol.

FIG. 16 is a diagram illustrating an example of an extended power calibration curve constructed through an extended power calibration protocol.

Referring to FIG. 16, the wireless power transmitter 1001 constructs a power calibration curve based on the calibration data points included in the first received power packet (RP/1), second received power packet (RP/2), and additional received power packet (RP/2) that have transmitted the ACK, respectively.

The wireless power transmitter 1001 may construct the first power calibration curve (B1) connecting the first calibration data points (Pt1, RP/1) and the second calibration data points (Pt2, RP/2) and the second power calibration curve (B2) connecting the second calibration data point (Pt2, RP/2) and the third calibration data point (Pt3, RP/3) when constructing a power calibration curve based on three calibration data points.

Among the power calibration curves, the first power calibration curve (B1) constructed based on the first received power packet (RP/1) and the second received power packet (RP/2) may be an existing power calibration curve constructed at the beginning of the power transfer phase.

In the state in which the parameters for the existing power calibration curve (B1) are saved, it acquires information on the third calibration data point (Pt3, RP/3) based on the information obtained from the additional received power packet (RP/2) that transmits the ACK in the extended power calibration protocol, and the wireless power transmitter 1001 may construct a second power calibration curve B2 extending from the existing power calibration curve B1 to the third calibration data points Pt3 and RP/3.

The first power calibration curve (B1) and the second power calibration curve (B2) may be defined as linear functions having different slopes and y-intercepts, respectively, the wireless power transmitter 1001 detects a foreign object according to a loss of transmission power using the received power value confirmed using the received power packet (e.g., RP/0) received from the wireless power receiver 1002, transmit power, and parameters of the power calibration curve including the first power calibration curve (B1) and the second power calibration curve (B2) (S1207).

Since the wireless power transmitter 1001 can extend the power calibration curve at a desired point in time through the above-described extended power calibration protocol, as the calibration range is increased, a wider range of power values can be calibrated, and the reliability of calibration is increased, the reliability of foreign object detection based on power loss is also increased.

(2) Construct of Power Recalibration Curve

Figure 17:
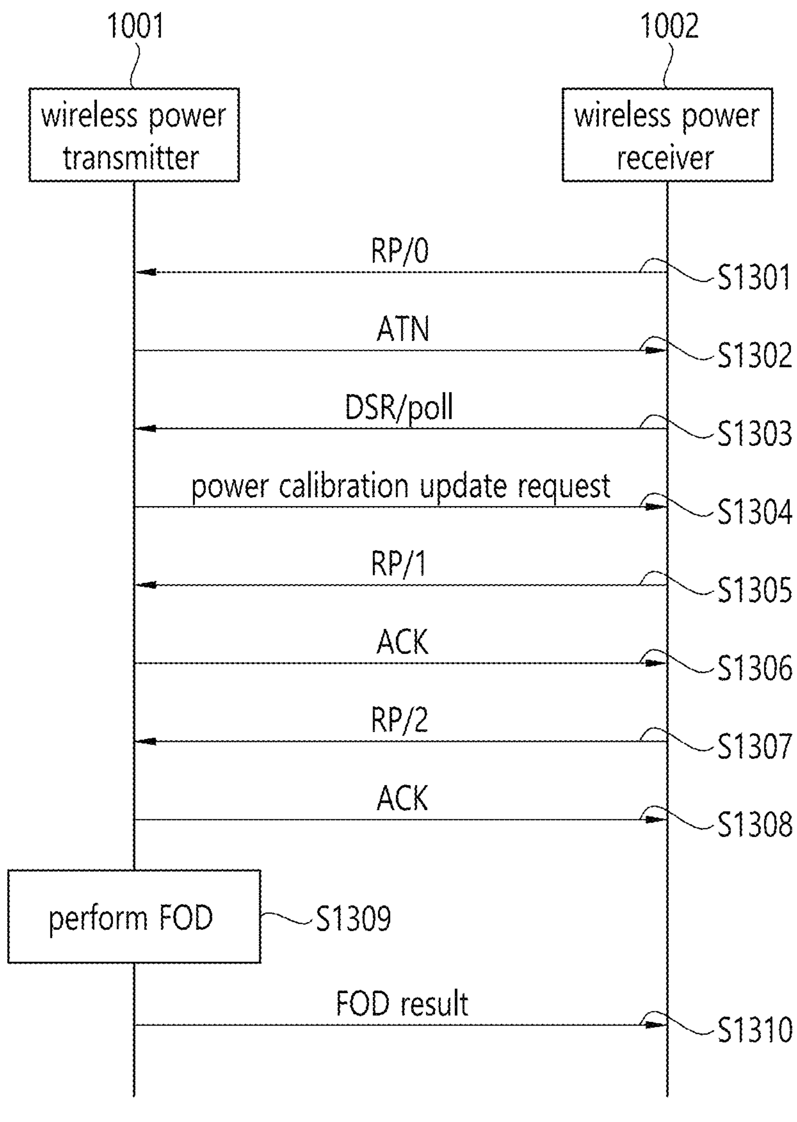
FIG. 17 is a flowchart illustrating a power calibration protocol (hereinafter, referred to as a power recalibration protocol) for constructing a power recalibration curve according to an embodiment.

FIG. 17 is a flowchart illustrating a power calibration protocol (hereinafter, referred to as a power recalibration protocol) for constructing a power recalibration curve according to an embodiment.

Each step shown in FIG. 17 may be performed in a power transfer phase.

Since steps S1201, S1202, and S1203 have been described above with reference to FIG. 13, further description thereof will be omitted.

The wireless power transmitter 1001 receiving the DSR/poll from the wireless power receiver 1002 may transmit a power calibration request packet to the wireless power receiver 1002 (S1304).

Since the power calibration protocol described with reference to FIG. 17 is a power recalibration protocol, when transmitting a power calibration request packet having the message field of FIG. 14 in step S1304, the wireless power transmitter 1001 transmits a power calibration request packet in which the value of the mode field is set to 1. When transmitting a power calibration request packet having the message field of FIG. 15 in step S1304, the wireless power transmitter 1001 transmits a power calibration request packet in which a value of the request field indicates a power recalibration protocol.

The wireless power receiver 1002 that has received the power calibration request packet transmits a first received power packet (RP/1) including estimated received power value information, which is a first calibration data point (first calibration data point) based on the information included in the power calibration request packet (S1305). The first received power packet RP/1 is a received power packet having a mode value of 1.

Although not shown, the wireless power receiver 1002 may transmit a control error packet before transmitting the first received power packet (RP/1) in step S1305, the wireless power transmitter 1001 determines whether the wireless power receiver 1002 has reached a desired target operating point based on the control error value included in the control error packet, and it responds with ACK or NAK to the first received power packet (RP/1) (S1306). The wireless power receiver 1002 may continue to transmit the first received power packet RP/1 and the control error packet until it receives an ACK from the wireless power transmitter 1001.

After the ACK for the first received power packet (RP/1) is transmitted/received (S1306), the wireless power receiver 1002 transmits a second receive power packet (RP/2) including information on an estimated received power value that is a second calibration data point based on the information included in the power calibration request packet (S1307). The second received power packet RP/2 is a received power packet having a mode value of 2.

Although not shown, the wireless power receiving device 1002 may transmit a control error packet before transmitting the second received power packet (RP/2) in step S1307, the wireless power transmitter 1001 determines whether the wireless power receiver 1002 has reached a desired target operating point based on the control error value included in the control error packet, and it responds with ACK or NAK to the second received power packet (RP/2) (S1308). The wireless power receiver 1002 may continue to transmit the second received power packet (RP/2) and the control error packet until it receives the ACK from the wireless power transmitter 1001.

After the ACK for the second received power packet (RP/2) is transmitted/received (S1308), the wireless power receiver 1002 and the wireless power transmitter 1001 may enter a normal power transmission mode.

The wireless power transmitter 1001 updates the existing power calibration curve (C1) with a new power calibration curve (C2) (refer to FIG. 18) based on the “first received power packet (RP/1) and the second received power packet (RP/2)” that have transmitted the ACK, foreign object detection based on transmission power loss may be performed using the new power calibration curve C2 (S1309).

The wireless power transmitter 1001 that has detected the foreign object may transmit the foreign object detection result to the wireless power receiver 1002 (S1310). The foreign object detection result may be expressed as ACK or NAK. That is, the wireless power transmitter 1001 performs foreign object detection, if it is determined that there is no foreign object, an ACK is transmitted to the wireless power receiver 1002, and if it is determined that the foreign object exists, the NAK may be transmitted to the wireless power receiver 1002.

When it is determined that there is no foreign object, the wireless power transmitter 1001 and the wireless power receiver 1002 may continuously maintain a power transfer phase.

If it is determined that a foreign object exists, the wireless power receiver 1002 maintains the existing operation point and receives power according to the existing power transmission contract, it switches to a low power mode where the received power is 5 W or less, it stops the power transfer phase by transmitting an End Power transfer data packet (EPT) to the wireless power transmitter 1001, it resets the wireless power transmitter 1001, or it initializes a protocol for wireless power transfer so that foreign object detection (pre-power transfer FOD) is performed before power transfer.

Figure 18:
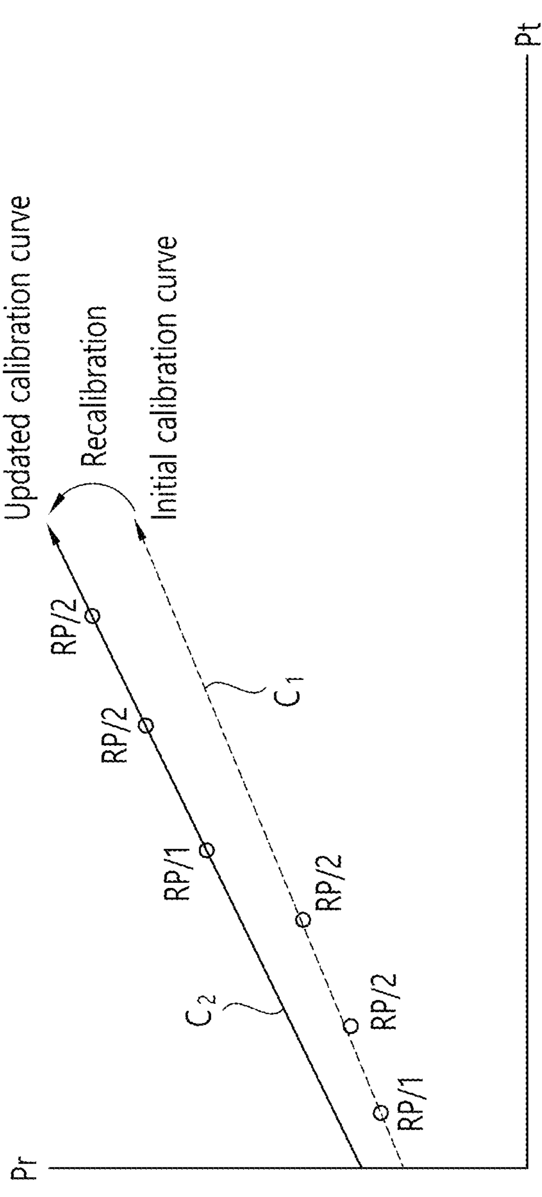
FIG. 18 is a diagram illustrating an example of a new power calibration curve constructed through a power recalibration protocol.

FIG. 18 is a diagram illustrating an example of a new power calibration curve constructed through a power recalibration protocol.

Referring to FIG. 18, the wireless power transmitter 1001 discards the existing power calibration curve C1, it constructs a new power calibration curve (C2) based on the calibration data points included in the first received power packet (RP/1) and the second received power packet (RP/2) that have transmitted the ACK, respectively, foreign object detection according to transmission power loss is performed using the parameters of the new power calibration curve C2 (S1309).

The wireless power transmitter 1001, as necessary, for example, when the wireless power receiver changes an operating point (for example, a target rectified voltage) during power transmission, power recalibration can be performed without the need to reset the wireless power transmitter. Therefore, it is possible to prevent the charging time for the wireless power receiver from increasing due to the reset of the wireless power transmitter, as the power calibration curve can be updated according to the change of the operating point, the reliability of foreign object detection is also increased.

The wireless power transmission apparatus in the embodiment according to the above-described FIGS. 9 to 18 corresponds to the wireless power transmission apparatus or the wireless power transmitter or the power transmission unit disclosed in FIGS. 1 to 8. Accordingly, the operation of the wireless power transmitter in this embodiment is implemented by one or a combination of two or more of each component of the wireless power transmitter in FIGS. 1 to 8. For example, transmission of a power calibration request packet by a wireless power transmitter, construction of the power calibration curve, expansion and/or reorganization, execution of the foreign object detection method, transmission of ACK/NAK according to the foreign object detection result, transmission/reception of other data packets and response patterns, etc. may be performed by communication/control circuitry 120, 710 and/or 790.

In addition, the wireless power receiving apparatus in the embodiment according to FIGS. 9 to 18 corresponds to the wireless power receiving apparatus or the wireless power receiver or the power receiving unit disclosed in FIGS. 1 to 8. Accordingly, the operation of the wireless power receiver in this embodiment is implemented by one or a combination of two or more of the respective components of the wireless power receiver in FIGS. 1 to 8. For example, reception of the power calibration request packet by the wireless power receiver, transmission of the received power packet based on the power calibration packet, reception of ACK/NAK according to the foreign object detection result, reception/transmission of other data packets, etc. may be performed by the communication/control unit 220, 810 and/or 890.

Since the wireless power transmitting method and apparatus or the wireless power receiver and method according to an embodiment of the present disclosure do not necessarily include all the elements or operations, the wireless power transmitter and method and the wireless power transmitter and method may be performed with the above-mentioned components or some or all of the operations. Also, embodiments of the above-described wireless power transmitter and method, or receiving apparatus and method may be performed in combination with each other. Also, each element or operation described above is necessarily performed in the order as described, and an operation described later may be performed prior to an operation described earlier.

The description above is merely illustrating the technical spirit of the present disclosure, and various changes and modifications may be made by those skilled in the art without departing from the essential characteristics of the present disclosure. Therefore, the embodiments of the present disclosure described above may be implemented separately or in combination with each other.

Therefore, the embodiments disclosed in the present disclosure are intended to illustrate rather than limit the scope of the present disclosure, and the scope of the technical spirit of the present disclosure is not limited by these embodiments. The scope of the present disclosure should be construed by claims below, and all technical spirits within a range equivalent to claims should be construed as being included in the right scope of the present disclosure.

What is claimed is:

1. A wireless power transmitter, comprising:

a power converter related to transferring a wireless power to a wireless power receiver; and a controller related to controlling the wireless power, wherein the wireless power transmitter:

initiates a digital ping to solicit a response from the wireless power receiver, receives the response from the wireless power receiver, transmits, to the wireless power receiver, a data packet related to a calibration at a time determined by the wireless power transmitter based on a foreign object being suspected near the wireless power receiver during a power transfer phase, and performs one of a foreign object detection (FOD), an extended calibration or a recalibration after transmitting the data packet, wherein the data packet includes request information indicating a type of operation requested by the wireless power transmitter, and wherein the request information has a first value for requesting the extended calibration, a second value requesting the recalibration and a third value for requesting a slot for the FOD during the power transfer phase.

2. The wireless power transmitter of claim 1, wherein, based on the request information having the first value for requesting the extended calibration, the wireless power transmitter receive a received power (RP) packet having a mode value 2 related to an additional calibration point from the wireless power receiver.

3. The wireless power transmitter of claim 2, wherein the wireless power transmitter performs the extended calibration based on the RP packet having the mode value 2.

4. The wireless power transmitter of claim 1, wherein, based on the request information having the second value for requesting the recalibration, the wireless power transmitter receive a received power (RP) packet having a mode value 1 related to a first calibration point and a RP packet having a mode value 2 related to an additional calibration point from the wireless power receiver.

5. The wireless power transmitter of claim 4, wherein the wireless power transmitter performs the recalibration based on the RP packet having the mode value 1 and the RP packet having the mode value 2.

6. The wireless power transmitter of claim 1, wherein the request information is composed of 2 bits.

7. A method for transferring a wireless power to a wireless power receiver, the method performed by a wireless power transmitter and comprising:

initiating a digital ping to solicit a response from the wireless power receiver;

receiving the response from the wireless power receiver;

transmitting, to the wireless power receiver, a data packet related to a calibration at a time determined by the wireless power transmitter based on a foreign object being suspected near the wireless power receiver during a power transfer phase; and performing one of a foreign object detection (FOD), an extended calibration or a recalibration after transmitting the data packet, wherein the data packet includes request information indicating a type of operation requested by the wireless power transmitter, and wherein the request information has a first value for requesting the extended calibration, a second value requesting the recalibration and a third value for requesting a slot for the FOD during the power transfer phase.

8. The method of claim 7, wherein, based on the request information having the first value for requesting the extended calibration, the wireless power transmitter receive a received power (RP) packet having a mode value 2 related to an additional calibration point from the wireless power receiver.

9. The method of claim 8, wherein the wireless power transmitter performs the extended calibration based on the RP packet having the mode value 2.

10. The method of claim 7, wherein, based on the request information having the second value for requesting the recalibration, the wireless power transmitter receive a received power (RP) packet having a mode value 1 related to a first calibration point and a RP packet having a mode value 2 related to an additional calibration point from the wireless power receiver.

11. The method of claim 10, wherein the wireless power transmitter performs the recalibration based on the RP packet having the mode value 1 and the RP packet having the mode value 2.

12. The method of claim 7, wherein the request information is composed of 2 bits.

13. A wireless power receiver, comprising:

a power pickup related to receiving wireless power from a wireless power transmitter; and a controller related to controlling the wireless power, wherein the wireless power receiver:

receives a digital ping to solicit a response from the wireless power receiver, transmits the response to the wireless power transmitter, receives, from the wireless power transmitter, a data packet related to a calibration at a time determined by the wireless power transmitter based on a foreign object being suspected near the wireless power receiver during a power transfer phase, and performs one of a foreign object detection (FOD), an extended calibration or a recalibration after receiving the data packet, wherein the data packet includes request information indicating a type of operation requested by the wireless power transmitter, and wherein the request information has a first value for requesting the extended calibration, a second value requesting the recalibration and a third value for requesting a slot for the FOD during the power transfer phase.

* * * * *